(No Model.)  T. W. MOORE.  2 Sheets—Sheet 1.
VEHICLE WHEEL.

No. 251,017.  Patented Dec. 13, 1881.

Witnesses:

Inventor.
Thos W Moore
By A. P. Thayer
atty (No Model.) 2 Sheets—Sheet 2.
T. W. MOORE.
VEHICLE WHEEL.
No. 251,017. Patented Dec. 13, 1881.
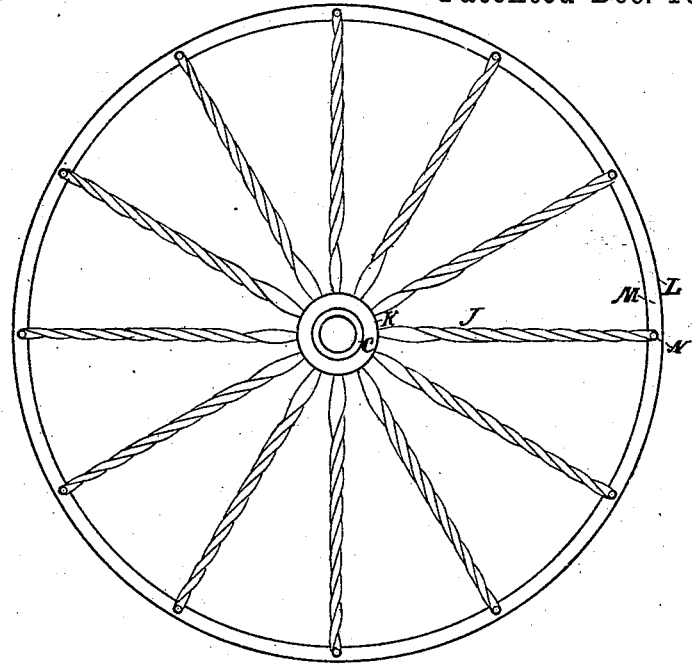
Fig. 3.
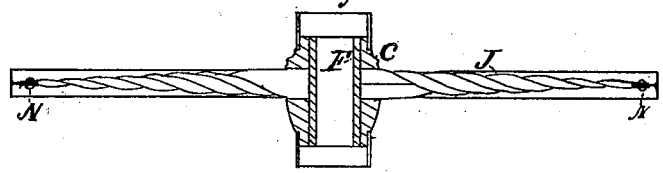
Fig. 4.
Fig. 6.
Fig. 5.
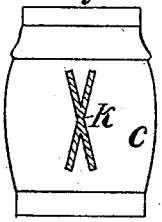
Fig. 7. Fig. 8.
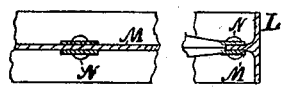
Witnesses:
O. J. Morgan
S. H. Morgan
Inventor.
Thos. W. Moore
By A. P. Thayer
atty

UNITED STATES PATENT OFFICE.

THOMAS W. MOORE, OF PLAINFIELD, NEW JERSEY, ASSIGNOR TO FREDK. M. MOORE, OF CAMDEN, NEBRASKA.

VEHICLE-WHEEL.

SPECIFICATION forming part of Letters Patent No. 251,017, dated December 13, 1881.

Application filed March 21, 1881. (No model.)

*To all whom it may concern:*

Be it known that I, THOMAS W. MOORE, of Plainfield, Union county, and State of New Jersey, have invented a new and useful Improvement in Vehicle-Wheels, of which the following is a specification.

My invention consists of improvements in wheels for sulkies and other vehicles, the objects of which are to secure greater strength and durability for equal weight, and to improve the construction of roller devices for lessening the friction of the wheels on the axis to gain in speed. I propose to make fluted and twisted spokes and flanged metal rims of steel, phosphor-bronze, or other strong metal, and to fit anti-friction rollers in the hubs for the wheels to turn on, instead of turning on the axle, as in common use, arranging them in a novel manner, whereby they can be located nearer the axis than heretofore, to lessen the size of the hub without lessening the strength of the axle.

Figure 1:
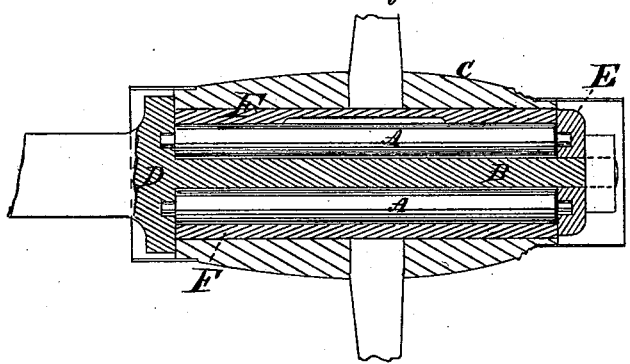
Figure 2:
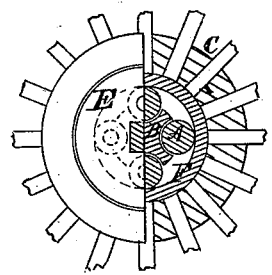

Figure 1 is a longitudinal section of hubs with anti-friction rollers arranged according to my invention. Fig. 2 is partly a transverse section and partly an end elevation of the same. Fig. 3 is a side elevation of a wheel, showing the improvement in spokes. Fig. 4 is a horizontal section through the middle of the wheel. Fig. 5 is a transverse section of a spoke near the hub. Fig. 6 is a transverse section of a bar or rod, showing the form of fluted or ribbed metal I propose to use for the spokes. Figs. 7 and 8 are details of the spoke and wheel-rim.

For the application of anti-friction rollers A within the hubs of wheels of vehicles, I propose to construct the axle B in fluted shape, as shown, making it in conformity with the angular or star-shaped space within the circle of rollers, so that with a given quantity of metal in the axle for strength I can bring the rollers within a smaller circle than can be done when the axle is in the common form, thus enabling a smaller hub to be used, and at the same time make the axle much stronger. The axle being thus formed, the rollers A are mounted on said axle B by having their journals arranged in bearings in the inner fixed collar, D, and the outer attached collar, E, these collars being fixed so as to afford substantial support to said rollers while the hub rolls around on them.

In order to obtain the greatest possible strength in the spokes with the least material, I propose to use fluted or finned rods J, such as shown in cross-section in Fig. 6, or any equivalent form flattened thin, as at K, where they enter the hub. I make them taper from the hub to the rim L and twist them between the hub and the rim to stiffen them, and, together with them, employ a metal rim with an inner middle flange, M, to stiffen the rim, and for attaching the spokes, which I flatten and split for a short distance at the outer end to embrace said flange and be riveted thereto, as shown at N.

The object of flattening the spokes where they enter the hub is to reduce their thickness in the direction of the circumference of the hub, to make room for the number required and to save cutting across the grain of the hub too much.

It is manifest that wheels of great strength can be made with very light rims and spokes of this construction; but I do not limit myself to twisting the spokes, although that is the best, for they may be used with good results without, and I may use these spokes with wood rims.

What I claim, and desire to secure by Letters Patent, is—

1. The combination, with the hub and axle of a vehicle-wheel, of anti-friction rollers the journals of which are mounted in stationary bearings on the axle, and the axle having fluted sides, and made in its cross-section in the form of angular or star-shaped space surrounded by the rollers, substantially as described.

2. The combination, in a vehicle-wheel, of fluted or ribbed and twisted spokes and a metal rim having the inner flange, M, substantially as described.

3. A spoke for vehicle-wheels, made of a fluted or ribbed metal rod, when twisted as described.

4. The combination, in a vehicle-wheel, of fluted or ribbed spokes having the form of a cross in transverse section, and a metal rim having the inner flange, M, said spokes being flattened at the connection with the hub and crotched at the connection with the flange M of the rim, as and for the purposes described.

5. The combination, in a vehicle-wheel, of a wood hub and twisted and fluted or ribbed metal spokes, substantially as described.

THOMAS W. MOORE.

Witnesses:
W. J. MORGAN,
S. H. MORGAN.